UNITED STATES PATENT OFFICE.

FRITZ SAHLFELD, OF HANOVER, GERMANY.

METHOD OF MAKING EXTRACT OF FISH.

SPECIFICATION forming part of Letters Patent No. 554,540, dated February 11, 1896.

Application filed December 27, 1894. Serial No. 533,139. (No specimens.)

*To all whom it may concern:*

Be it known that I, FRITZ SAHLFELD, a subject of the King of Prussia, German Emperor, and a resident of Hanover, in the Kingdom of Prussia, German Empire, have invented a new and useful Method of Manufacturing an Extract of Fish, of which the following is an exact specification.

This invention relates to the manufacture of an extract of the meat of all sorts of fish suitable for that purpose.

In carrying my method into practice, I first free the dead fish from their skins, as well as from scales, heads, tails, fins, entrails, and the like, and I then clean the remaining meat by means of warm water. The removal of the said parts, as well as the washing of the remaining useful parts, is of importance, as otherwise the quality of the extract produced might be greatly impaired, or the extract, perhaps, be rendered perfectly useless. The removed parts may be used up as manure.

The cleaned meat is reduced to small pieces, and the said pieces are mixed with as much water as necessary for their being properly extracted. I have found that it is for the most sorts of fish-meat sufficient to use only so much water that the meat is just covered by the same. The mixture is boiled within a closed iron vessel having a steam-coil or steam-jacket, the temperature being kept below 300° Fahrenheit, as a higher temperature might result in the formation of products impairing the quality of the extract. In order to obtain at that temperature the greatest yield possible, the pressure within the said iron vessel is increased up to seven atmospheres by the introduction of heated compressed air. If that pressure were to be produced solely by the steam formed out of the water containing the meat, the temperature would become too high a one; and if, on the other hand, the compressed air would be introduced in a cold state (with its natural temperature or that of the outer air, respectively,) into the vessel, it would become heated and strongly expand within the latter, so that the pressure would become far stronger than intended. These difficulties are avoided by the use of heated compressed air, the temperature of which is equal to that existing within said vessel. If the meat is to be properly exhausted and the extract is to be a perfectly good one, the temperature should be near to 300° Fahrenheit and the pressure should be about seven atmospheres. Both these conditions can simultaneously be attained solely by the employment of heated compressed air. The process may be accelerated by agitating the mass during the cooking by means of a suitable stirring device. After the mass has been properly cooked it is led over into a reservoir, whereafter the liquid portion of the mass containing the dissolved parts of the latter is separated from the other portion containing the non-dissolved parts. This is preferably performed by a filter-press. The brown liquor containing the extract is poured into an iron vessel having a steam-jacket, and being preferably of funnel-like shape in order to afford a better separation of the fat. The liquor is heated within said vessel, and is left therein until all the fat has been separated. The latter is thereafter skimmed, and the remaining liquor is concentrated by means of a vacuum-pan or the like until the required consistency has been reached. The extract is now finished.

Having thus fully described the nature of this invention, what I desire to secure by Letters Patent of the United States is—

1. The method of manufacturing an extract of fish-meat, consisting in mixing the chopped or reduced meat with water, cooking the mixture under pressure produced by heated compressed air, separating the liquor with its dissolved parts from the non-dissolved parts, freeing the liquor from fat, and concentrating it in the requisite degree, substantially as described.

2. The method of manufacturing an extract of fish-meat, consisting in mixing the chopped or reduced meat with water, cooking the mixture at a temperature of about 300° Fahrenheit under pressure produced by heated compressed air, separating the liquor with its dissolved parts from the non-dissolved parts, freeing the liquor from fat, and concentrating it to the requisite degree, substantially as described.

3. The method of manufacturing an extract of fish-meat, consisting in mixing the chopped or reduced meat with water, cooking the mixture at a temperature of about 300° Fahrenheit at a pressure of about seven atmospheres produced by heated compressed air, separating the liquor with its dissolved parts from the non-dissolved parts, freeing the liquor from fat, and concentrating it to the requisite degree, substantially as described.

In testimony whereof I have signed this specification in the presence of two subscribing witnesses.

FRITZ SAHLFELD.

Witnesses:
  OTTO MAULL,
  HERMANN PAPE.